(12) United States Patent
Bates (10) Patent No.: US 9,709,104 B2
(45) Date of Patent: Jul. 18, 2017

(54) MECHANICALLY DISENGAGING OVERRUNNING CLUTCH

(71) Applicant: Julian Bates, Detroit, MI (US)

(72) Inventor: Julian Bates, Detroit, MI (US)

(73) Assignee: Julian Bates, Detroit, MI (US)

( * ) Notice: Subject to any disclaimer, the term of this patent is extended or adjusted under 35 U.S.C. 154(b) by 0 days.

(21) Appl. No.: 14/816,376

(22) Filed: Aug. 3, 2015

(65) Prior Publication Data
US 2016/0053832 A1    Feb. 25, 2016

Related U.S. Application Data

(60) Provisional application No. 62/041,131, filed on Aug. 24, 2014.

(51) Int. Cl.
*F16D 41/18*    (2006.01)

(52) U.S. Cl.
CPC .................. *F16D 41/185* (2013.01)

(58) Field of Classification Search
CPC ........ F16D 41/00; F16D 41/185; F16D 41/22; F16D 43/02; F16D 2023/123
USPC .................................................. 192/41 R, 46
See application file for complete search history.

(56) References Cited

U.S. PATENT DOCUMENTS

| 4,232,770 A | 11/1980 | Tuzson |
| 4,271,941 A | 6/1981 | Miller |
| 4,368,808 A * | 1/1983 | Teraoka .................. F16D 43/02 192/36 |
| 5,833,041 A | 11/1998 | Hashimoto |
| 2006/0278486 A1* | 12/2006 | Pawley ................... F16D 41/12 192/43.1 |

FOREIGN PATENT DOCUMENTS

WO    2010/034223 A1    4/2010

* cited by examiner

*Primary Examiner* — Richard Lorence
(74) *Attorney, Agent, or Firm* — Dinsmore & Shohl LLP (57) ABSTRACT

A one way overrunning clutch capable of fully disconnecting a drive and driven members during overrunning by utilizing helical teeth or utilizing jaw teeth. Both assembly types provide a drive connection in one rotational direction and allow for overrunning in the opposite rotational direction. Both helical and jaw tooth coupling systems contain a spring loaded actuating plate allowing it to move along either assembly's common axis, enabling components connected to the drive or driven to be completely unconnected when overrunning occurs under certain operating conditions.

18 Claims, 11 Drawing Sheets

MECHANICALLY DISENGAGING OVERRUNNING CLUTCH

CROSS-REFERENCE TO RELATED APPLICATIONS

The instant application claims priority to U.S. Provisional Patent Application No. 62/041,131 filed on Aug. 24, 2014, which is incorporated in its entirety herein by reference.

FIELD OF THE INVENTION

The present application is directed to a one-way clutch, and in particular to a one-way clutch having a fully disconnected drive and driven members during overrunning through the use of helical teeth or jaw teeth.

BACKGROUND OF THE INVENTION

One-way clutches in rotary power transmission systems that can be used as safety devices and/or shift components are known. Such one-way clutches are commonly used in the powertrain or driveline of automotive vehicles. However, heretofore known one-way clutches exhibit ratcheting when the clutch is in an overrun configuration in which gear teeth slide mechanically over each other. Such ratcheting involves frictional losses due to the mechanical sliding between gear teeth and thus less than desired efficiency.

In addition to the above, advances in automatic transmissions for motor vehicles have resulted in additional transmission speeds. For example, automotive manufacturers have new 10-speed transmissions for rear wheel drive vehicles. In addition, such new transmissions still have a transmission length similar to older 5-speed transmissions. As such, components that take or occupy a minimum amount of space within a vehicle transmission are desired. Therefore, a one-way clutch that provides complete disengagement of gear teeth during an overrunning configuration and occupies minimal space would be desirable.

SUMMARY OF THE INVENTION

A one way overrunning clutch that is capable of fully disconnecting the drive and driven members during overrunning by utilizing helical teeth or utilizing jaw teeth is provided. The clutch assemblies can be made from powdered metal, however this is not required. The one way clutch provides a drive connection in one rotational direction and allows for overrunning in the opposite rotational direction. The one way clutch can use a helical tooth and/or jaw tooth coupling system and either coupling system can contain a spring loaded actuating plate allowing it to move along a common axis and thereby enabling components connected to the drive or driven to be completely unconnected when overrunning occurs under certain operating conditions.

The advantage of not having a connection, under certain operating conditions, between the drive and driven members provides improvements in energy efficiency and wear of the clutch. In addition, actuation is not provided by an electric motor that converts electrical energy into mechanical motion. Rather, actuation is made possible by cam tracks in an outermost cam plate connected to a drive or driven member, which contains cam track grooves for the actuation plate's track followers. The track followers slide the actuation plate into a position in the cam tracks that can hold or keep the clutch in its "open" or decoupled position during rotation.

An outer diameter of a biasing member, e.g. a slotted disc or Belleville spring, a wave spring, etc., is seated within a bore of the cam plate and its inner diameter is bound by an actuating plate's flange and raised face. Ratcheting or axial oscillation of the actuation plate is primarily due to the coupling's tooth geometry (helical or jaw) during overrunning. When the drive connected to the cam plate overruns the drive connected to the counter plate, the actuating plate's teeth (helical or jaw) slide over the counter plate's adjoining teeth causing ratcheting of the actuating plate. This ratcheting is also made possible by the actuating plate's outermost race serving as a journal surface to a bearing liner's inner race which is bound by the cam plate's bore. Although not required, the bearing liner can be made from polytetrafluoroethylene (PTFE) or tetrafluoroethylene (TFE). Also, the bearing liner is adhered to the bore of the cam plate and serves as a journal bearing. It is appreciated that PTFE and TFE are sold under trade names such as Teflon, Frelon etc., where different brands may have their own additional proprietary fillers. The material from which the bearing liner is made provides a better wear solution than the otherwise metal-to-metal friction between an inner race of the cam plate and an outermost race of the actuation plate.

In one embodiment, the clutch assembly uses helical teeth to couple the drive and driven members and helical teeth are on the inner race of an actuating plate and on the outer race of a counter plate, which is connected to an opposite drive. Therefore, if the design calls for the cam plate to be connected to the drive, then the counter plate is connected to the driven member. The helical teeth are mutually spaced apart on each of the respective races so that the teeth equally hold torque during backspin, and during overrunning ratcheting is allowed, which can lead to full disengagement under certain operating conditions. The helical teeth allow for engagement and disengagement to be smooth, avoiding an abrupt or shock impact. This assembly also has friction material adhered to the actuating plate's flange, which provides impact absorption and friction to help reduce relative speed between the drives during backlash.

In another embodiment, the clutch assembly uses jaw teeth to couple the drive and driven members have teeth that are similar to jaw clutches with sawtooth-like teeth. However, the teeth are angled "forward" along the circumference of the plate's diameter, which in turn facilitates engagement and disengagement initiated by rotation between the actuating and counter plates. Therefore, the jaw teeth produce similar engagement and disengagement characteristics that are employed by the assembly utilizing helical teeth. The usually sharp tips of the sawtooth-like jaw teeth are rounded off. The counter plate's jaw teeth geometrically adjoin to the actuation plate's teeth geometry. However, when absorption or shock padding is adhered to the counter plate's teeth surface the plate's tooth geometry is changed to compensate for the padding. This padding is intended to prevent shock impact during relatively high engagement speeds or during high impact backspin or backlash and is not intended to provide otherwise additional friction, but is a surface that facilitates engagement and disengagement between the teeth while increasing durability in higher torque capacity applications. The teeth on the counter plate can be made to fit the teeth of the actuating plate without the use of padding, therefore losing the benefits of an impact absorbing material, but benefiting from design simplicity. Overrunning characteristics are similar regardless of assembly and may occur if the relative rotational speed difference between the drive and driven members is in the same direction or when one of the plates connected to either the drive or driven members is stationary.

DETAILED DESCRIPTION OF THE INVENTION

A one-way clutch for a motor vehicle is provided. The one-way clutch includes a cam plate with outer splines and a counter plate with inner splines. The one-way clutch also includes an actuation plate between the cam plate and the counter plate, the actuation plate having a predetermined and limited amount of sliding engagement with the cam plate. An engagement mechanism that is operable to provide selective engagement between the actuation plate and the counter plate can also be present. Finally, a biasing member between the cam plate and the counter plate is present and the biasing member is operable to expand and contract in a direction that is parallel to a central axis of the cam plate. The biasing member also moves the actuation plate along the central axis between an overrun position with the counter plate and a disengaged position with the counter plate.

The cam plate can have a side wall with an inner race and the side wall can have a plurality of cam track grooves that extend outwardly from the inner race into the side wall. The plurality of cam track grooves each have a first angled portion and a second angled portion. The first angled portion is offset from the central axis by a first angle and the second angled portion is offset from the central axis by a second angle. The second angle is larger than the first angle.

The cam plate has a plurality of notches and the biasing member can be a slotted disc spring with a plurality of slots. The plurality of notches are located at least partially within the plurality of slots such that the slotted disc spring is engaged with the cam plate and held in a fixed rotational arrangement therewith. In the alternative, the biasing member can be a wave spring with a plurality of curves or bends and the plurality of notches are located at least partially within the plurality of curves or bends such that the slotted disc spring is engaged with the cam plate and held in a fixed rotational arrangement therewith.

The actuation plate can have a cylindrical side wall and a flange with a raised face extending from the side wall transverse to the central axis. The slotted disc spring exerts and withdraws a force on the raised face in order to move the actuation plate along the central axis between the overrun position with the counter plate and the disengaged position with the counter plate. The actuation plate side wall also has a plurality of track followers that are rigidly attached thereto and extend outwardly towards the cam plate. Each of the plurality of track followers extend at least partially into one of the cam track grooves such that sliding of the track followers within the plurality of cam track grooves provides the predetermined and limited amount of sliding engagement of the actuation plate with the cam plate. The actuation plate is in the overrun position when the plurality of track followers are within the first angled portion of the plurality of cam track grooves. The actuation plate is in the disengaged position when the plurality of track followers are within the second angled portion of the plurality of cam track grooves.

The slotted disc spring can be in a fully compressed position when the plurality of track followers are within the second angled portion of the plurality of cam track grooves.

The engagement mechanism can be actuation plate helical teeth extending in an inwardly direction and counter plate helical teeth extending in an outwardly direction. The actuation plate helical teeth and the counter plate helical teeth are dimensioned, located, and oriented to overrun each other when the actuation plate and the counter plate rotate in directions opposite each other. Also, the actuation plate helical teeth and the counter plate helical teeth are dimensioned, located, and oriented in order to engage each other when the actuation plate and the counter plate rotate in the same direction.

The actuating plate can have a cylindrical-shaped actuating plate side wall and the counter plate can have a cylindrical-shaped counter plate side wall. The counter plate side wall can be dimensioned to fit within the actuation plate side wall and the actuation plate helical teeth can extend in the inwardly direction from the actuation plate side wall and the counter plate helical teeth can extend in the outward direction from the counter plate side wall.

In other instances, the engagement mechanism is actuation plate jaw teeth extending in a first direction parallel to the central axis and counter plate jaw teeth extending in a second direction parallel to the central axis. The first direction is opposite to the second direction. The actuation plate jaw teeth and the counter plate jaw teeth are dimensioned, located, and oriented to overrun each other when the actuation plate and the counter plate rotate in directions opposite each other. In the alternative, the actuation plate jaw teeth and the counter plate jaw teeth are dimensioned, located, and oriented to engage each other when the actuation plate and the counter plate rotate in the same direction.

The actuating plate can have a cylindrical-shaped actuating plate side wall and the counter plate can have a cylindrical-shaped counter plate side wall. In such instances, the actuation plate jaw teeth extend parallel to the actuating plate side wall in the first direction and the counter plate jaw teeth extend parallel to the counter plate side wall in the second direction which is opposite to the first direction.

Figure 1:
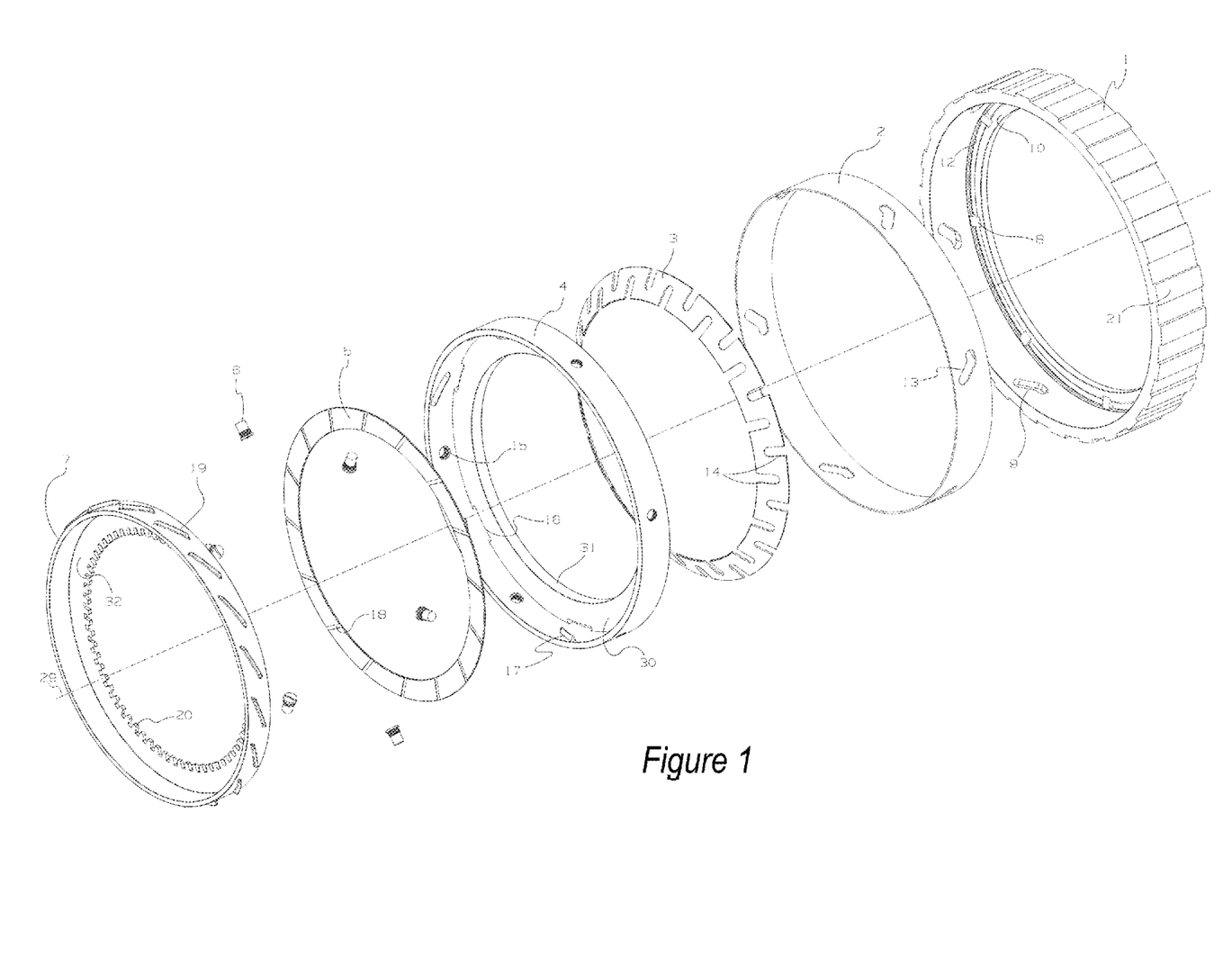
FIG. 1 is an isometric view of the clutch assembly utilizing the helical teeth, showing the components exploded.
Figure 6:
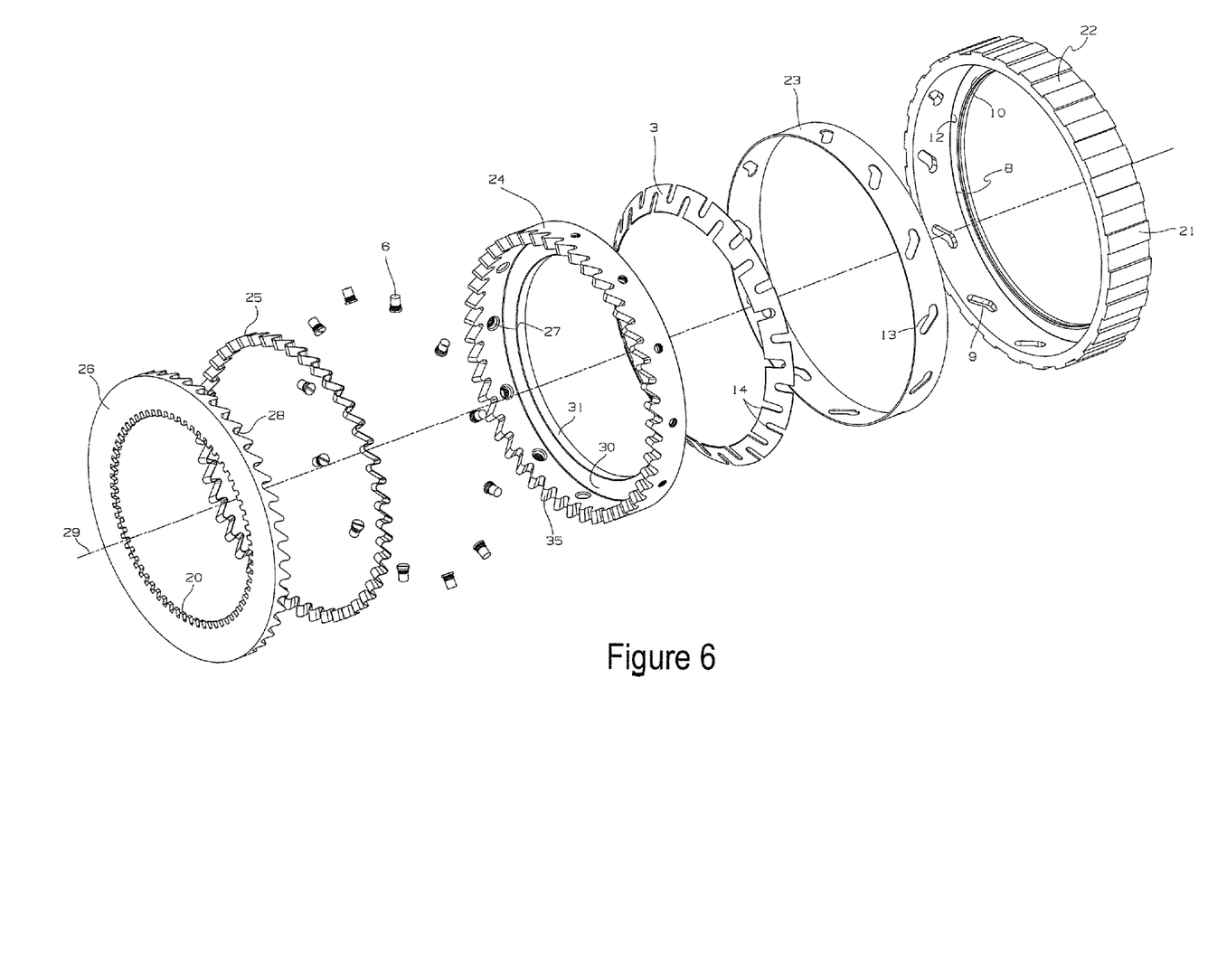
FIG. 6 is an isometric view of the clutch assembly utilizing the jaw teeth, showing the components exploded.
Figure 7:
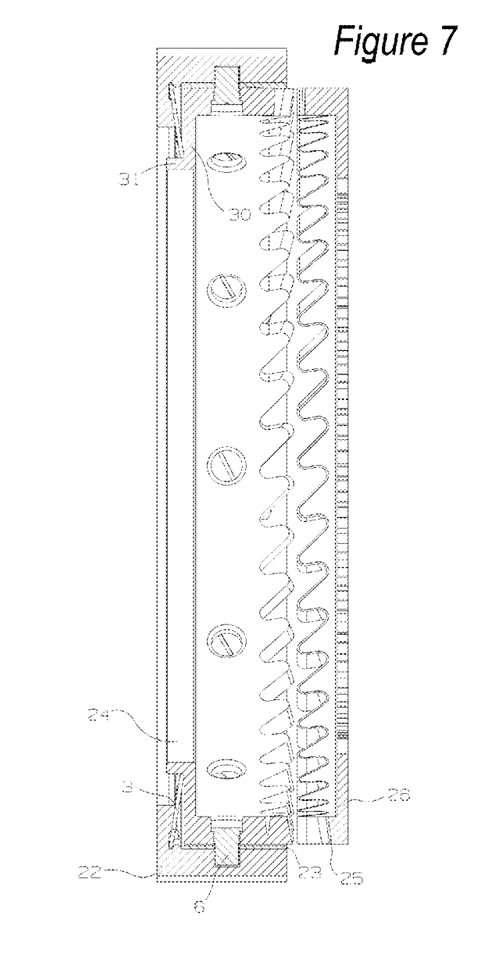
FIG. 7 is a cross-section view cut along the diametral plane of the clutch assembly shown in FIG. 6, consisting of the engagement components with jaw teeth and showing the clutch disengaged.
Figure 8:
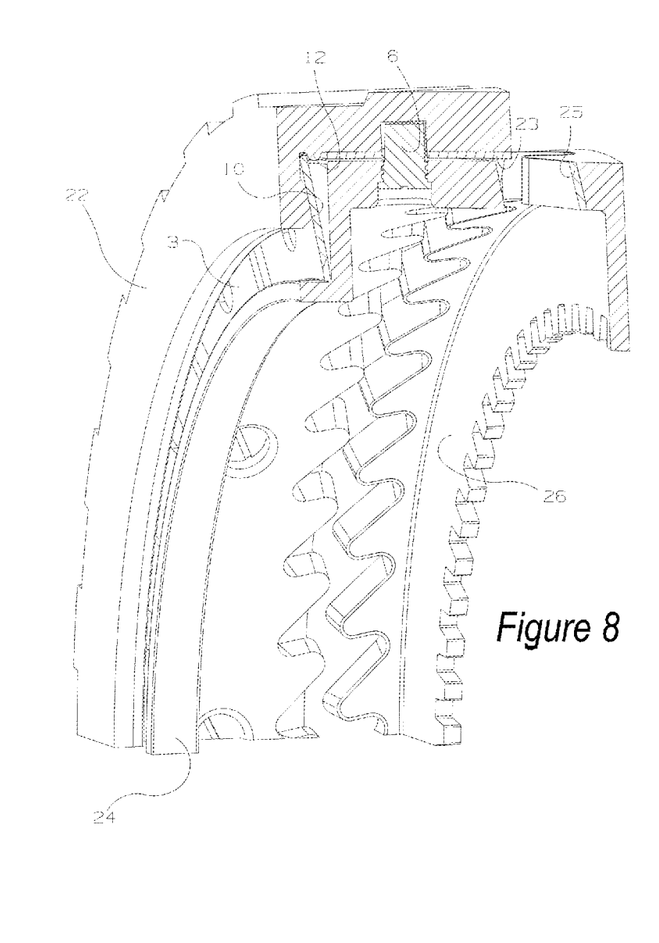
FIG. 8 is an isometric view in partial cross section cut across the diametral plane of the clutch assembly shown in FIG. 6, consisting of the engagement components with jaw teeth and showing the clutch disengaged.
Figure 9:
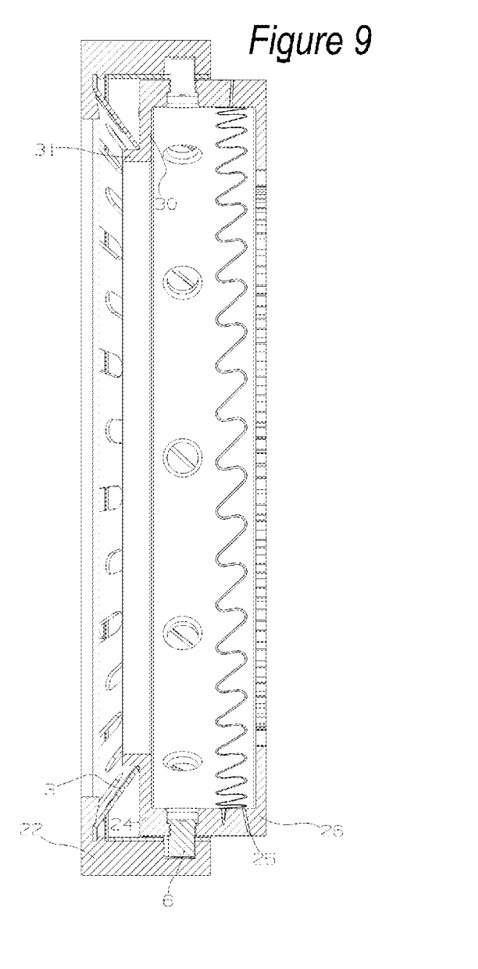
FIG. 9 is a cross-section view cut along the diametral plane of the clutch assembly shown in FIG. 6, consisting of the engagement components with jaw teeth and showing the clutch engaged.
Figure 10:
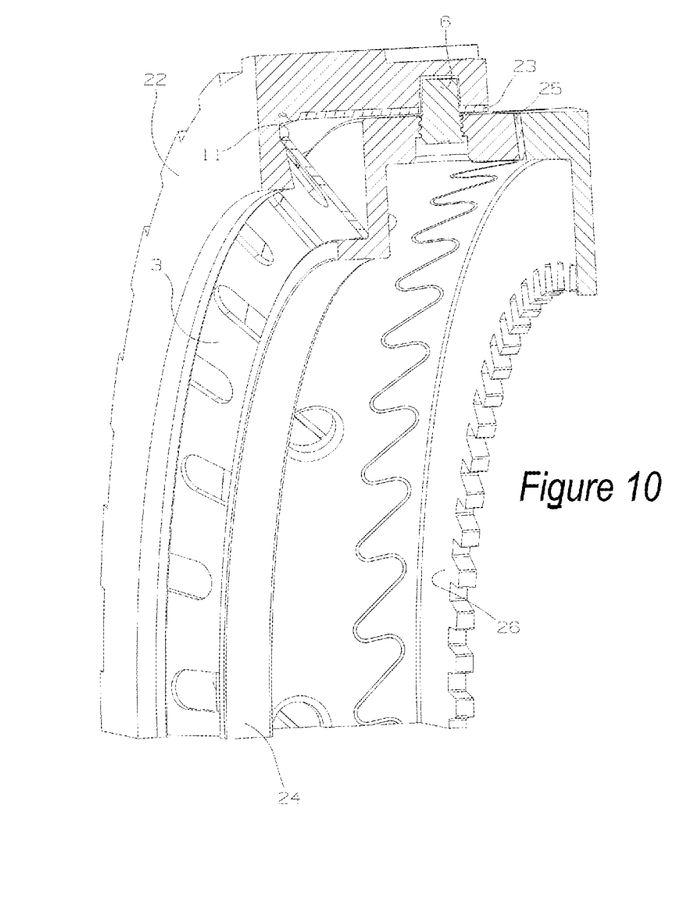
FIG. 10 is an isometric view in partial cross section cut across the diametral plane of the clutch assembly shown in FIG. 6, consisting of the engagement components with jaw teeth and showing the clutch engaged.
Figure 15:
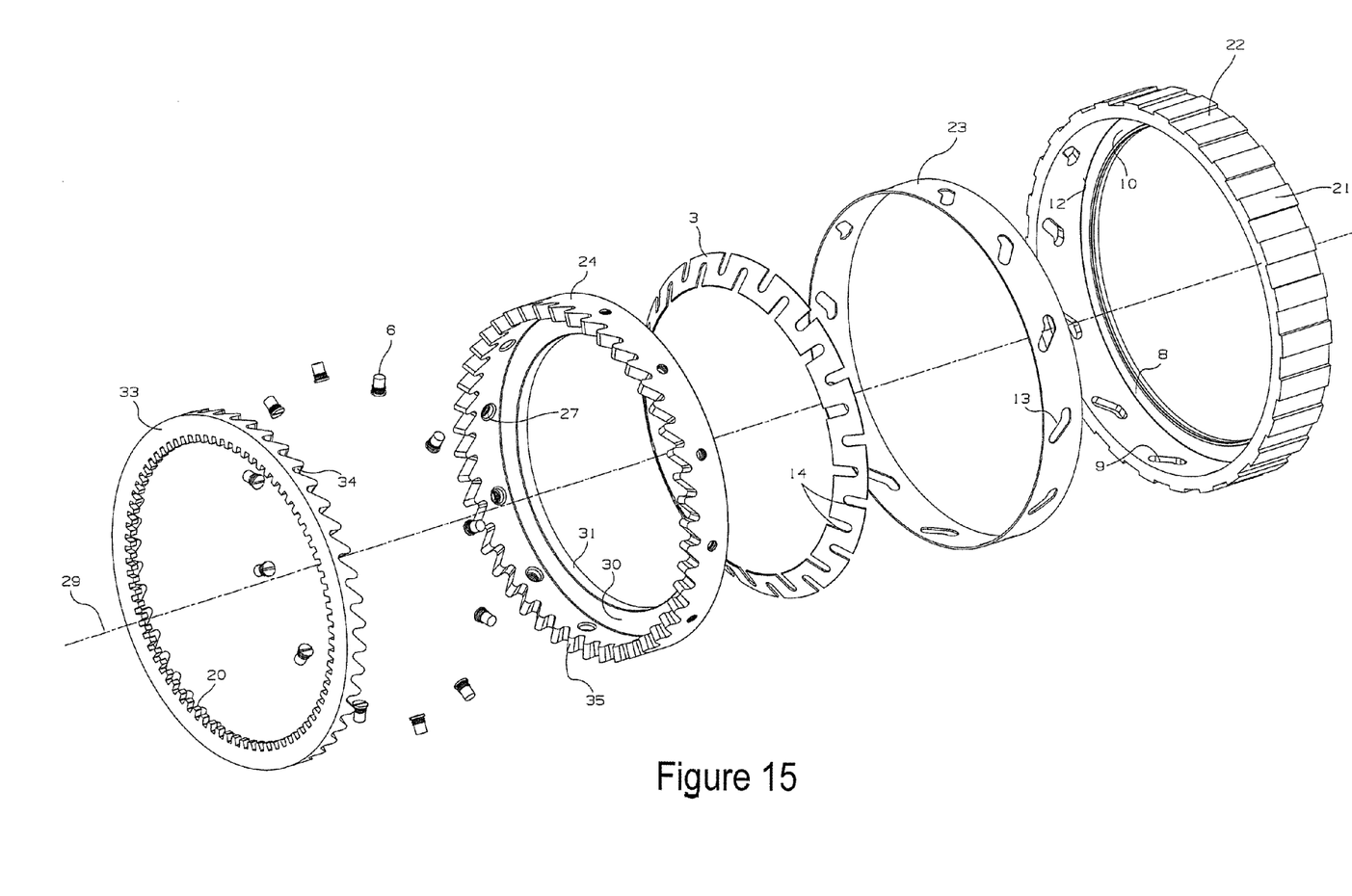
FIG. 15 is an isometric view of the clutch assembly with jaw teeth and is an alternative to the assembly in FIG. 6, showing the components exploded and with the assembly not employing an absorption impact material like the assembly in FIG. 6.

Referring now to the figures, FIG. 1, FIG. 6 and FIG. 15 are exploded views of the similar one-way clutch assemblies that provide coupling by means of helical teeth (17, 19) or jaw teeth (28, 34, 35). The different coupling systems provide slightly different benefits, due to the different teeth geometry, but the same essential functionality.

FIG. 1 consists of a cam plate 1, bearing liner 2, slotted disc or Belleville spring 3, an actuation plate 4 consisting of helical teeth 17 on its inner race and also carrying a plurality of track followers 6 while friction material 5 is adhered to the actuating plate's flanged surface 30 that faces the counter plate 7 with helical teeth 19 mutually spaced on the counter plate's 7 outer race.

Figure 11:
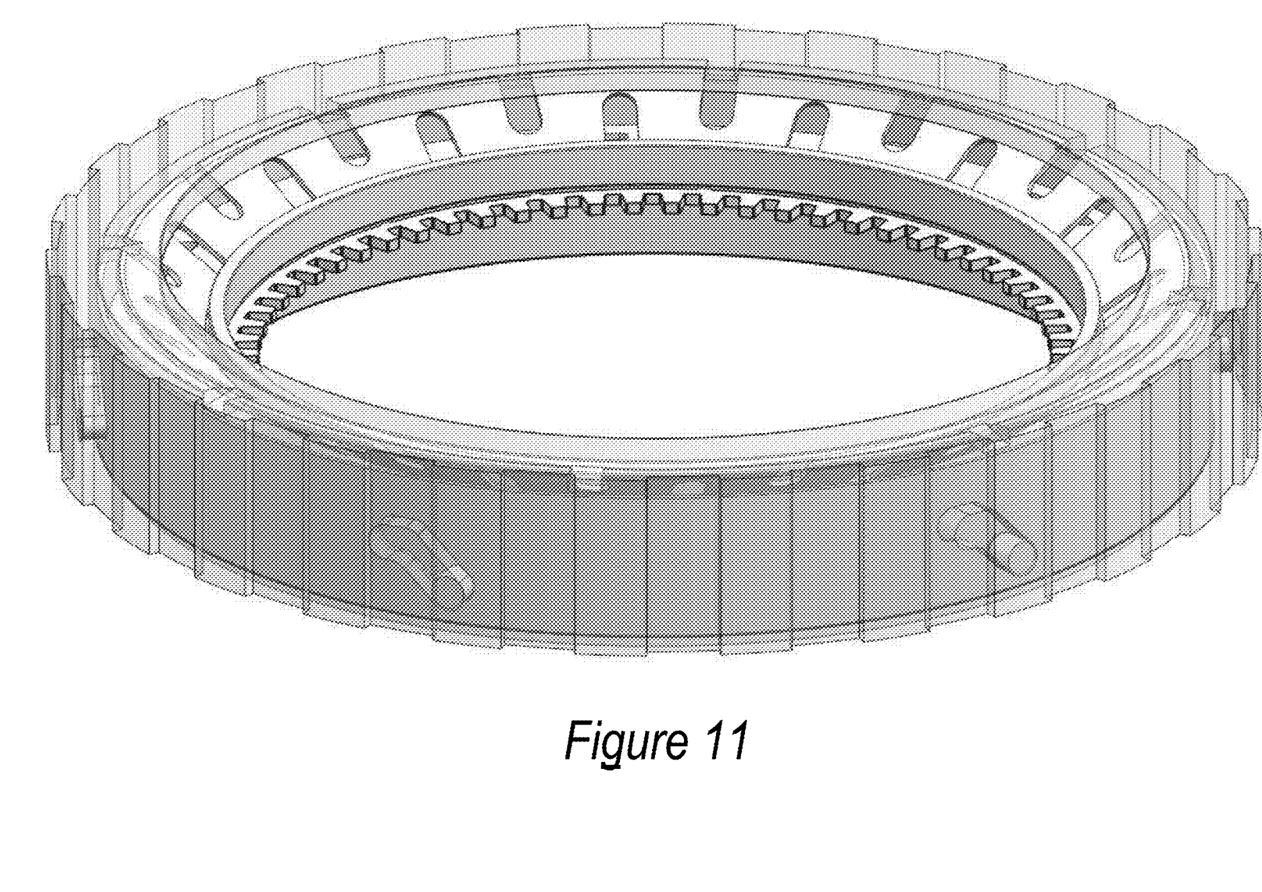
FIG. 11 is an isometric view of the clutch assembly with helical teeth displaying the coupling in its engaged configuration with the outermost plate or the cam plate transparent and all other components solid.
Figure 12:
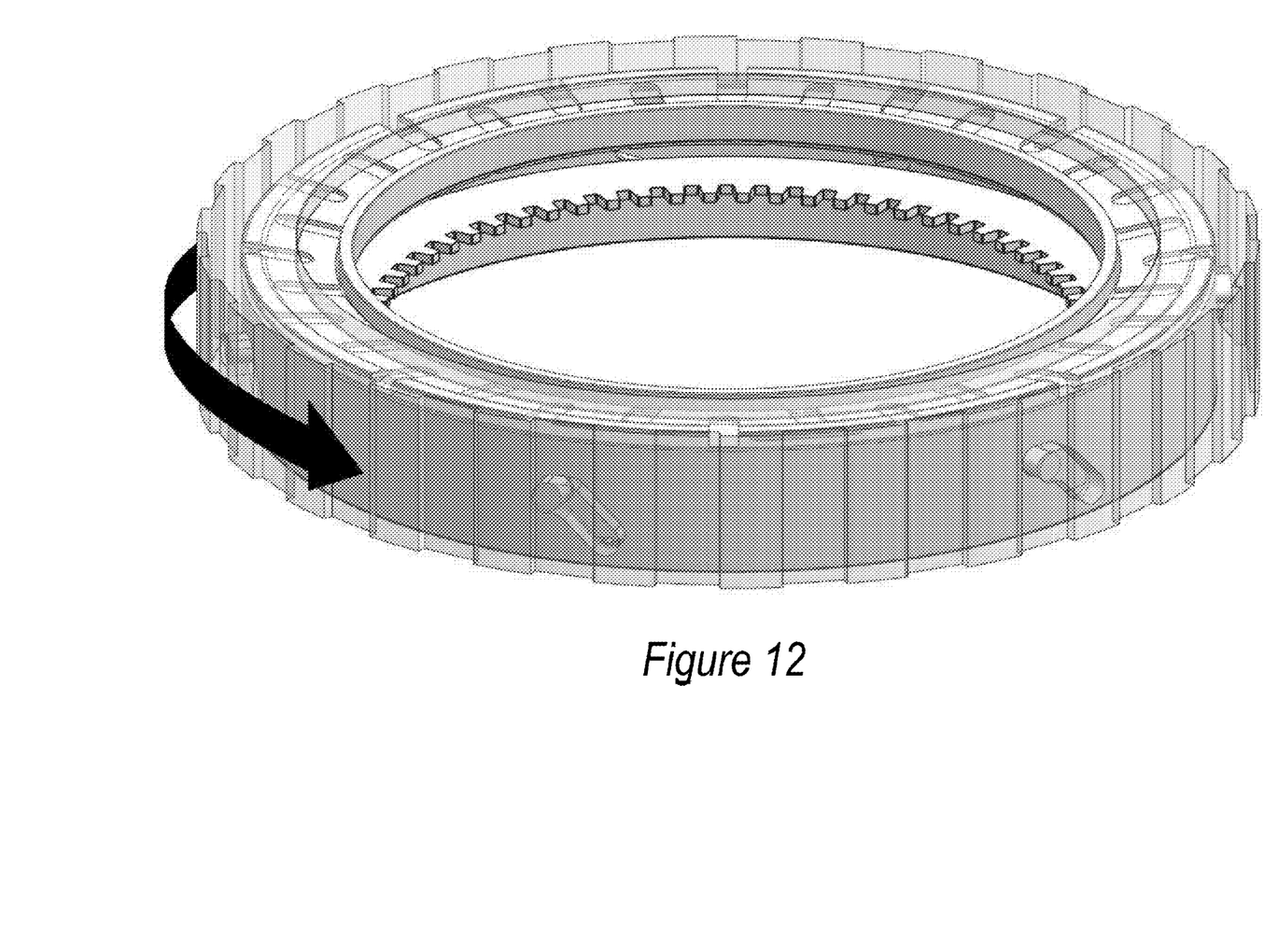
FIG. 12 is an isometric view of the clutch assembly with helical teeth displaying the coupling in its disengaged configuration with overrunning or freewheeling and a bold arrow indicating its direction of rotation, the outermost plate or the cam plate being transparent and all other components solid.

During overrunning, the cam plate 1 used in the clutch (shown in FIG. 1-5, FIG. 11 and FIG. 12) with helical teeth initially applies a force through its mutually spaced track grooves 9 on the track followers 6 that are rigidly joined to the actuating plate 4. If the force is high enough in magnitude its resulting directional components will cause the actuation plate 4 to move in the direction towards the cam plate 1 along the common axis 29 consequently compressing the slotted disc spring 3. FIG. 11 and FIG. 12 show the clutch assembly with helical teeth as it's in its fully engaged position FIG. 11 and fully disengaged position FIG. 12. In both FIG. 11-12 the cam plate 1 is transparent, which helps display the track followers 6 as their position changes in the track grooves 9 of the cam plate 1.

Figure 2:
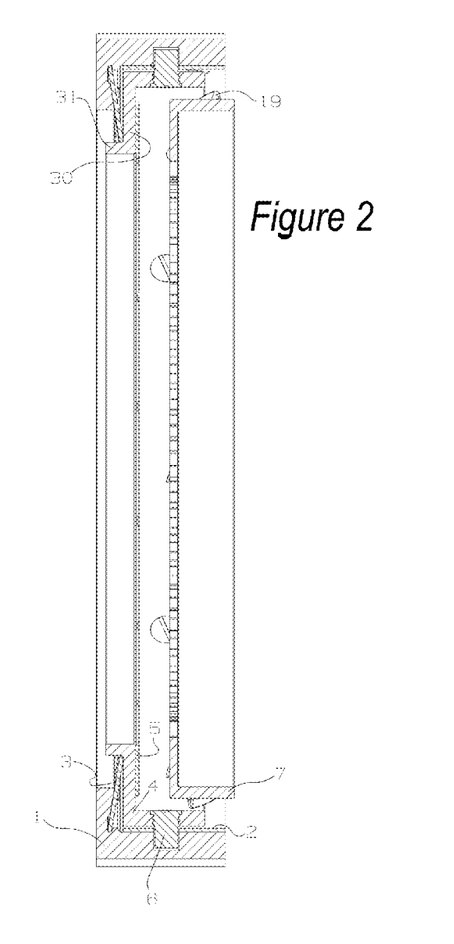
FIG. 2 is a cross-section view cut along the diametral plane of the clutch assembly shown in FIG. 1, consisting of the engagement components with helical teeth and showing the clutch in its disengaged configuration.
Figure 3:
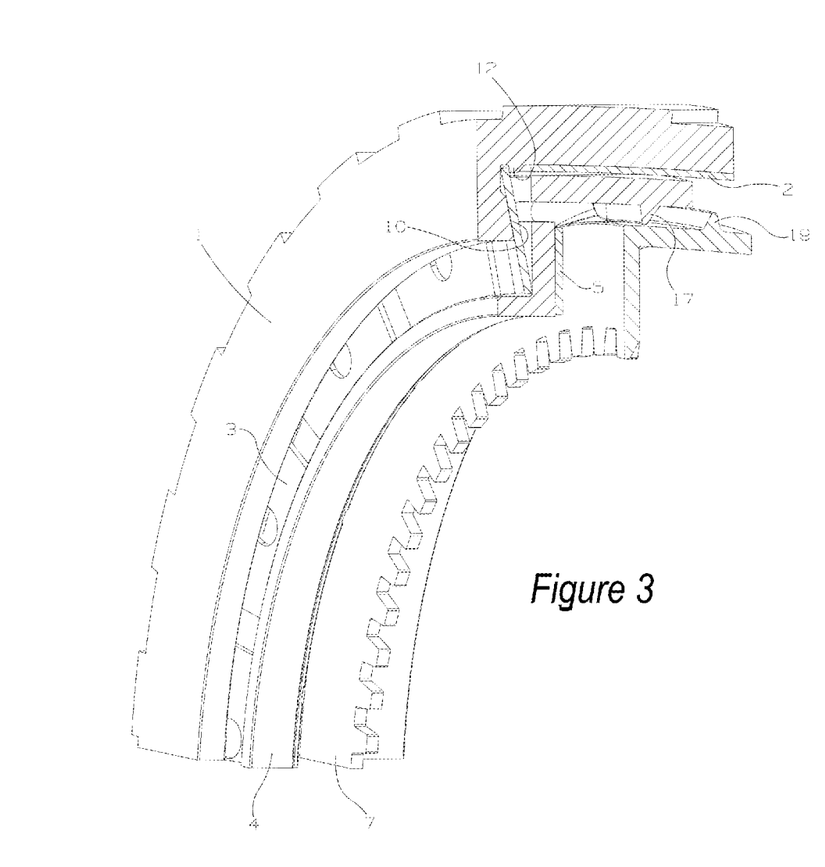
FIG. 3 is an isometric view in partial cross section cut across the diametral plane of the clutch assembly shown in FIG. 1, consisting of the engagement components with helical teeth and showing the clutch disengaged.

The actuation plate's 4 radial movement is constrained because it is pocketed in the cam plate 1, therefore only motion along the common axis 29 is allowed. Due to the helical teeth's geometry and mutual spacing periodic ratcheting of the actuation plate 4 occurs when the cam plate 1 and its connected actuation plate 4 overruns the counter plate 7. Continuous ratcheting may occur during overrunning but if the dynamics of the torque applied to the cam plate's splines 21 by the connected drive is high enough, steady-state or accelerating, the disc spring 3 will compress enough for the actuation plate 4 and counter plate 7 to lose contact due (completely disengage the clutch) to the seat that the cam plate track groove 9 provides for the track followers which can best be seen in FIG. 12. Therefore during overrunning, after a torque threshold on the cam plate 1 is met or exceeded and provides the necessary dynamic characteristics during overrunning, ratcheting ceases for a prolonged period of time and the spring loaded actuating plate 4 is in its decoupled position, as best seen in FIG. 2 and FIG. 3. If this torque threshold is not dynamically met or exceeded during prolonged disengagement, the cam plate 1 may slow down (experiencing a reduction in applied torque), stop, or reverse in direction where all three conditions will cease the prolonged period of decoupled motion during overrunning and ratcheting or backlash may occur.

Figure 4:
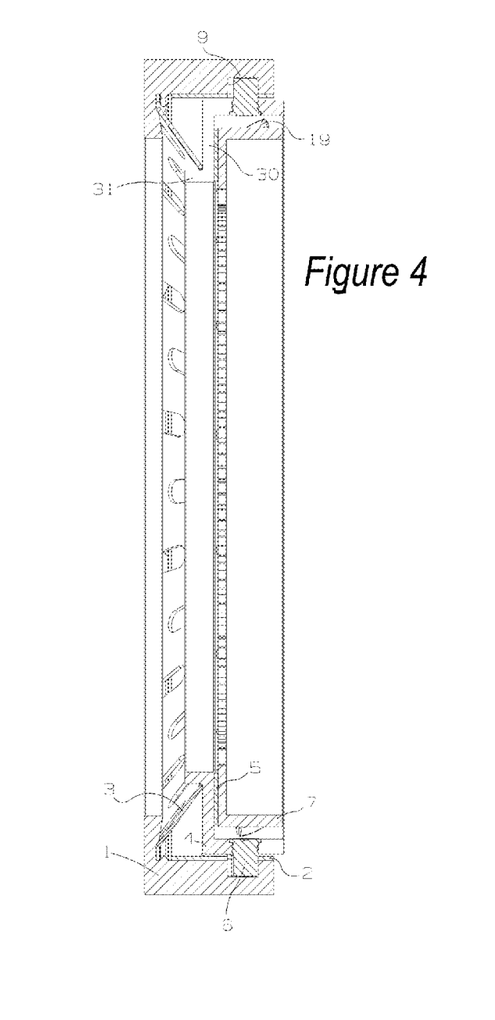
FIG. 4 is a cross-section view cut along the diametral plane of the clutch assembly shown in FIG. 1, consisting of the engagement components with helical teeth and showing the clutch engaged.
Figure 5:
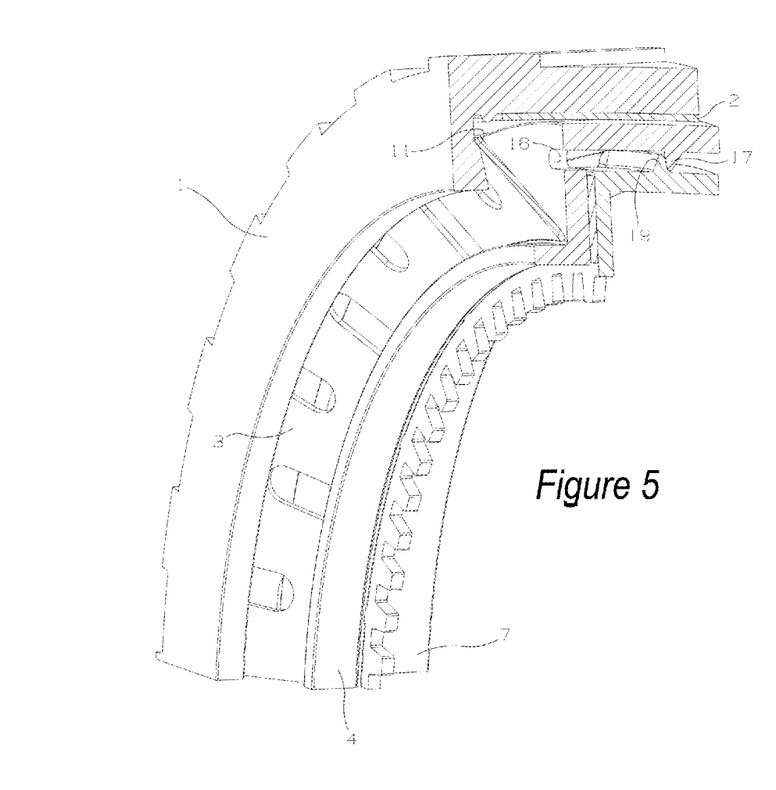
FIG. 5 is an isometric view in partial cross section cut across the diametral plane of the clutch assembly shown in FIG. 1, consisting of the engagement components with helical teeth and showing the clutch engaged.

More specifically, the actuating plate's ability to be displaced on the common axis 29 enables the clutch to engage and disengage. The slotted disc spring 3 is in its equilibrium position or close to equilibrium during full engagement or when there is zero displacement along the common axis 29 between the actuating 4 and counter plate 7, as best seen in FIG. 4 and FIG. 5. Overrunning occurs when the helical teeth of the actuating plate 17 and counter plate 19 slide over one another. Therefore the higher relative rotational speed of the driving plate (whether it's connected to the cam plate 1 or counter plate 7) causes its helical teeth's normal force and resulting directional component forces to push the actuating plate 4 along the common axis 29 causing ratcheting motion during overrunning. The driven shaft can be connected to the cam plate's splines 21 or the clutch can be flipped and the drive may be made to connect to the counter plate's splines 20.

If connected to the driven member, the counter plate 7 can also overrun the cam plate 1 in the opposite rotational overrunning direction allowed to the cam plate 1, however, ratcheting is always present in this state. This "reverse" function may be useful when the drive connected to the counter plate 7 needs to overrun. Due to the geometry of the helical teeth the counter plate 7 can only overrun in the opposite direction than the overrunning direction allowed to the cam plate. In other words, the cam plate 1 and counter plate 7 can both overrun one another but only in their respective rotational directions that are opposite to one another. The counter plate 7 which can only overrun while ratcheting (unable to achieve prolonged full disengagement that the cam plate 1 is capable of), is therefore a convenient application for a "reverse" gear commonly used in gearboxes.

The track followers 6, actuating plate 4, slotted disc spring 3, bearing liner 2, and cam plate 1 are designed so that they are conveniently assembled together. The bearing liner 2 is adhered to the cam plate's inner race and the disc spring 3 is pocketed in the cam plate 1 and its slots 14 are aligned with the cam plate's notches 8. Then the actuating plate 4 must be loaded on the disc spring 3 using its flange 30 and raised face 31. As shown in for example FIG. 2, the flange extends transverse to the central axis 29. Once the actuating plate 4 is placed in the cam plate's bore and its counter bored holes 15 are aligned to the cam plate's track grooves 9 then the track followers 6 can be fastened to the actuating plate 4 and extended into the cam plate's track grooves 9. The fastener design used is a threaded design also incorporating compression fitting or welds in addition to threads in order to permanently fix the track followers 6 to the actuating plate 4.

The slotted disc spring 3 saves space relative to coil springs allowing for a clutch design that can be better packaged in space constrained applications. The spring 3 rotates with the cam plate 1 as its slots 14 sit on the notches 8 of the cam plate 1. The slotted disc spring 3 provides a force that, when assembled, loads the actuating plate's teeth 17 onto the counter plate's teeth 19 and full engagement is accomplished as some backlash occurs. Full engagement is achieved when backlash occurs after the cam plate 1 and connected components rotates in the opposite direction of overrunning while the counter plate 7 is stationary. When the clutch is engaged, the slotted disc spring 3 is decompressed and sits on a seat 11 that helps constrain radial motion with the help of the actuating plate's flange 30 and the flange's raised surface 31, as best seen in FIG. 4 and FIG. 5. When the clutch is decoupled the slotted disc spring 3 is restricted from further compression by a seat 10 and extended groove 12, as best seen in FIG. 2 and FIG. 3. The slots 14 allow the disc spring's dynamic characteristics to change as it is compressed and decompressed. Therefore, the slots 14 may be adjusted to optimize the clutch's dynamic characteristics particularly during overrunning, engagement, and disengagement. The slots 14 also allow for the diameter to expand as it is compressed due to its inner diameter being supported by the raised face 31 and the actuating plate's flange 30.

The friction material 5 provides an impact surface along the common axis 29 and friction during backlash similar to the role friction paper 5 plays on multi-plate wet clutches and may be made of similar material such as conventional organic material. The friction material 5 stops upon impact against the counter plate's flange 32, at this position the actuating plate 4 puts the clutch in its fully engaged configuration. The friction material also has oil grooves 18 for applications where lubrication may be present. The clutch is therefore not designed to need lubrication however the assembly may be, for example, used in a gearbox where it may be subject to lubrication fluids. The draining holes 16 circumferentially placed along the actuating plate's flange 30 also anticipate possible applications where liquid lubrication may be present.

The jaw toothed clutch (FIG. 6-10, FIG. 13-15) provides the same essential functions and same assembly as the clutch assembly in FIG. 1 that uses helical teeth. FIG. 6 consists of a slightly different cam plate 22 (having more cam track grooves 9 than the cam plate 1 utilizing helical teeth), bearing liner 23 (also having more cam tracks 13), slotted disc or Belleville spring 3, an actuation plate 24 (consisting of jaw teeth 35) carrying a plurality of track followers 6 that is fastened to deeper counter bored holes 27, a counter plate 26 (consisting of jaw teeth) with adjoining shock absorption padding 25 adhered the counter plate's jaw teeth 28.

The assembly making use of jaw teeth functions very similar to the assembly using helical teeth. This assembly's jaw teeth provide the significant difference in functionality when compared to the assembly using helical teeth. The jaw teeth allow less backlash than the helical teeth due to the higher number of teeth used for the same given diameter, which reduces backlash and noise. The jaw toothed clutch assembly utilizes most of the same parts while being designed for a higher torque capacity and the actuation plate 24 has thicker walls and deeper counter bored holes 27 are used. The jaw teeth design has an advantage of carrying more torque as more teeth can be placed onto the actuating plate 24 and counter plate 26. Along with the higher number of jaw teeth for a given diameter, there are more track followers 6, there are thicker walls on its actuating plate 24, and there is an impact absorption material 25.

Figure 13:
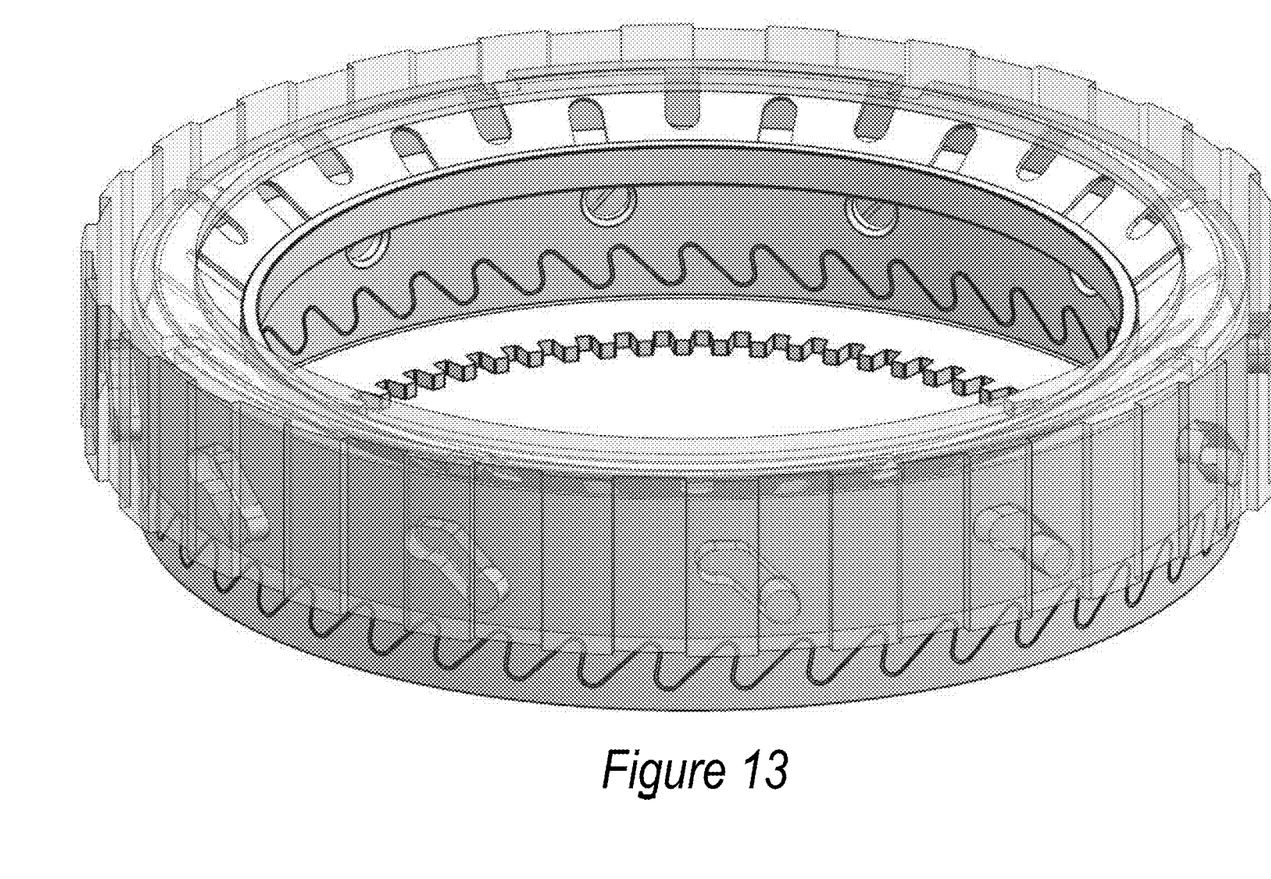
FIG. 13 is an isometric view of the clutch assembly with jaw teeth displaying the coupling in its engaged configuration with the outermost plate or the cam plate transparent and all other components solid.
Figure 14:
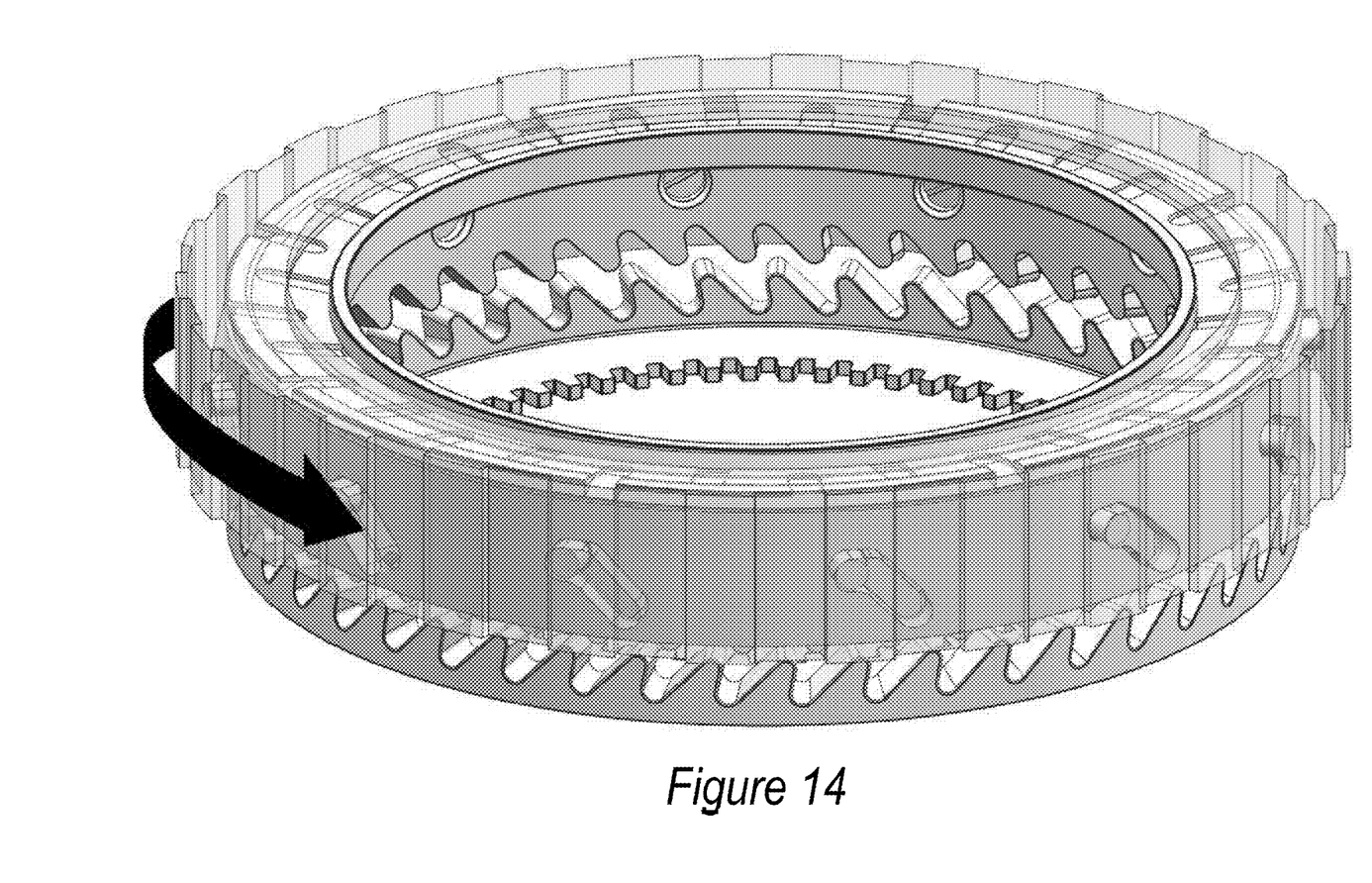
FIG. 14 is an isometric view of the clutch assembly with jaw teeth displaying the coupling in its disengaged configuration with overrunning or freewheeling and a bold arrow indicating its direction of rotation, the outermost plate or the cam plate is transparent and all other components solid.

In operation, the jaw teeth geometry engage (FIG. 9 and FIG. 10) along the common axis 29 and not the helix (axial and angular directions), which is the manner that the helical teeth engage. The cam plate 22 allows for more track followers 6, and like the assembly using helical teeth, uses a slotted disc spring 3. The cam plate 22, spring loaded actuation plate 24, and connected components overrun the counter plate 26 causing either ratcheting or a prolonged period of disengagement (FIG. 7 and FIG. 8) if certain operating conditions are met as explained before. The jaw teeth are mutually spaced and its geometry facilitates engagement and disengagement of the clutch. The jaw toothed counter plate 26 has the same "reverse" function as the helical toothed counter plate 7. Therefore, the cam plate 22 and counter plate 26 can only overrun in their respective rotational directions, which are opposite to one another. Overrunning of the cam plate 22 and its connected components (actuation plate 24, bearing liner 23, disc spring 3, and track followers 6) are displayed in FIG. 13 and FIG. 14. FIG. 13 displays the clutch assembly while it's fully engaged and in FIG. 14 displays the fully disengaged clutch while the cam plate 22 and its connected components overrun the counter plate 26. The cam plate 22 is transparent in FIG. 13 and FIG. 14 to display the different positions that the track followers 6 move to during full engagement and full disengagement.

Another design feature that differs from the assembly using helical teeth is the shock impact material or padded material 25 adhered to the jaw toothed counter plate's teeth 28. The shock impact pad 25 is a solution for the shock impact problems that jaw clutches have at higher rpms during backlash. This padding can be very thin and made to be impervious to water, steam, oils, high temperatures and bonded to the desired surface. Such padding is made by Fabreeka among other manufacturers of shock impact padding. The slotted disc spring 3 can also dissipate some of the impact energy from shock forces and therefore provide damping to the clutch upon engagement. The jaw clutch assembly can of course be designed without a shock pad (as seen in FIG. 15) for suitable applications where shock impact concern is non-existent or negligible. The assembly in FIG. 15 has all the same parts and features as the jaw clutch assembly without the shock pad however its counter plate 33 has jaw teeth 34 that directly adjoin to the actuating plate's teeth 35.

It should be appreciated that the embodiments, examples, etc. discussed above are for illustrative purposes only and do not limit the scope of the invention. In addition, it should be appreciated that changes, modifications, etc. can be made to the embodiments, examples, etc. and still fall within the scope of the invention. As such, it is the claims, and all equivalents thereof, which define the scope of the invention.

The invention claimed is:
1. A one-way clutch comprising:
   a cam plate with outer splines and a side wall with an inner race, said side wall having a plurality of cam track grooves extending outwardly from said inner race into said side wall;
   a counter plate with inner splines;
   an actuation plate between said cam plate and said counter plate, said actuation plate having a predetermined and limited amount of sliding engagement with said cam plate;

an engagement mechanism operable to provide selective engagement between said actuation plate and said counter plate; and a biasing member between said cam plate and said counter plate, said biasing member operable to expand and contract in a direction parallel to a central axis of said cam plate and move said actuation plate along said central axis between an overrun position with said counter plate and a disengaged position with said counter plate.

2. The one-way clutch of claim 1, wherein said plurality of cam track grooves each having a first angled portion and second angled portion, said first angled portion being offset from said central axis by a first angle and said second angled portion being offset from said central axis by a second angle, said second angle being larger than said first angle.

3. The one-way clutch of claim 2, wherein said cam plate has a plurality of notches and said biasing member is a slotted disc spring having a plurality of slots, said plurality of notches located at least partially within said plurality of slots such that said slotted disc spring is engaged with said cam plate and held in a fixed rotational arrangement with said cam plate.

4. The one-way clutch of claim 3, wherein said actuation plate has a cylindrical side wall and a flange with a raised face, said flange extending from said cylindrical side wall transverse to said central axis, said slotted disc spring exerting and withdrawing a force on said raised face to move said actuation plate along said central axis between said overrun position with said counter plate and said disengaged position with said counter plate.

5. The one-way clutch of claim 4, wherein said actuation plate side wall has a plurality of track followers rigidly attached thereto and extending outwardly towards said cam plate, each of said plurality of track followers extending at least partially into one of said cam track grooves such that sliding of said track followers within said plurality of cam track grooves provides said predetermined and limited amount of sliding engagement of said actuation plate with said cam plate.

6. The one-way clutch of claim 5, wherein said actuation plate is in said overrun position when said plurality of track followers are within said first angled portion of said plurality of said cam track grooves and said actuation plate is in said disengaged position when said plurality of track followers are within said second angled portion of said plurality of said cam track grooves.

7. The one-way clutch of claim 6, wherein said slotted disc spring is in a fully compressed position when said plurality of track followers are within said second angled portion of said plurality of said cam track grooves.

8. The one-way clutch of claim 7, wherein said engagement mechanism is actuation plate helical teeth extending in an inwardly direction and counter plate helical teeth extending in an outwardly direction, said actuation plate helical teeth and said counter plate helical teeth dimension, located and oriented to overrun each other when said actuation plate and said counter plate rotate in directions opposite each other, and engage each other when said actuation plate and said counter plate rotate in the same direction.

9. The one-way clutch of claim 7, wherein said engagement mechanism is actuation plate jaw teeth extending in a first direction parallel to said central axis and counter plate jaw teeth extending in a second direction parallel to said central axis, said first direction being opposite to said second direction, said actuation plate jaw teeth and said counter plate jaw teeth dimension, located and oriented to overrun each other when said actuation plate and said counter plate rotate in directions opposite each other, and engage each other when said actuation plate and said counter plate rotate in the same direction.

10. The one-way clutch of claim 9, wherein said actuation plate has a cylindrical-shaped actuation plate side wall and said counter plate has a cylindrical-shaped counter plate side wall, actuation plate jaw teeth extending parallel to said actuation plate side wall in said first direction and said counter plate jaw teeth extending parallel to said counter plate side wall in said second direction.

11. A one-way clutch comprising:
a cam plate with outer splines;
a counter plate with inner splines;
an actuation plate between said cam plate and said counter plate, said actuation plate having a predetermined and limited amount of sliding engagement with said cam plate;
an engagement mechanism operable to provide selective engagement between said actuation plate and said counter plate, said engagement mechanism being actuation plate helical teeth extending in an inwardly direction and counter plate helical teeth extending in an outwardly direction, said actuation plate helical teeth and said counter plate helical teeth dimension, located and oriented to overrun each other when said actuation plate and said counter plate rotate in directions opposite each other, and engage each other when said actuation plate and said counter plate rotate in the same direction; and
a slotted disc spring between said cam plate and said counter plate, said slotted disc spring operable to expand and contract in a direction parallel to a central axis of said cam plate and move said actuation plate along said central axis between an overrun position with said counter plate and a disengaged position with said counter plate.

12. The one-way clutch of claim 11, wherein said cam plate has a side wall with an inner race, said side wall having a plurality of cam track grooves extending outwardly from said inner race into said side wall.

13. The one-way clutch of claim 12, wherein said plurality of cam track grooves each having a first angled portion and second angled portion, said first angled portion being offset from said central axis by a first angle and said second angled portion being offset from said central axis by a second angle, said second angle being larger than said first angle.

14. The one-way clutch of claim 13, wherein said cam plate has a plurality of notches and said biasing member is a slotted disc spring having a plurality of slots, said plurality of notches located at least partially within said plurality of slots such that said slotted disc spring is engaged with said cam plate and held in a fixed rotational arrangement with said cam plate.

15. The one-way clutch of claim 14, wherein said actuation plate has a cylindrical side wall and a flange with a raised face, said flange extending from said cylindrical side wall transverse to said central axis, said slotted disc spring exerting and withdrawing a force on said raised face to move said actuation plate along said central axis between said overrun position with said counter plate and said disengaged position with said counter plate.

16. The one-way clutch of claim 15, wherein said actuation plate side wall has a plurality of track followers rigidly attached thereto and extending outwardly towards said cam plate, each of said plurality of track followers extending at least partially into one of said cam track grooves such that sliding of said track followers within said plurality of cam track grooves provides said predetermined and limited amount of sliding engagement of said actuation plate with said cam plate.

17. The one-way clutch of claim 16, wherein said actuation plate is in said overrun position when said plurality of track followers are within said first angled portion of said plurality of said cam track grooves and said actuation plate is in said disengaged position when said plurality of track followers are within said second angled portion of said plurality of said cam track grooves.

18. A one-way clutch comprising:
   a central axis;
   a cylindrical-shaped cam plate having a cam plate side wall, said cam plate side wall having an outer surface with splines that are parallel to said central axis and an inner surface with an inner race, said cam plate also having a plurality of cam track grooves in said inner race, said cam track grooves extending from said inner race outwardly towards said outer surface;
   a cylindrical-shaped actuation plate having an actuation plate side wall with an inner race and a flange with a raised face, said flange extending from said actuation plate side wall inwardly towards and transverse to said central axis, said actuation plate also having actuation plate helical teeth extending inwardly from said inner race towards said central axis and plurality of counter bored holes through said actuation side wall;
   a slotted disc spring dimensioned to fit within said cam plate side wall and located between said actuation plate and said cam plate;
   a cylindrical-shaped counter plate having a counter plate side wall with an outer race and splines extending inwardly towards and transverse to said central axis, said counter plate also having counter plate helical teeth extending outwardly from said outer race, said counter plate helical teeth complementary inclined relative to said actuation plate helical teeth; and
   a plurality of track followers extending through said counter bored holes of said actuation plate and into said cam track grooves of said cam plate;
   said actuation plate helical teeth and said counter plate helical teeth dimension, located and oriented to overrun each other when said actuation plate and said counter plate rotate in directions opposite each other, and engage each other when said actuation plate and said counter plate rotate in the same direction;
   said slotted disc spring exerting a force on said actuation plate in a direction away parallel to said central axis;
   said actuation plate disengaged from said counter plate when said slotted disc spring is in a fully compressed position, said spring actuation plate helical teeth and said counter plate helical teeth operable to freely rotate spaced apart from and in directions opposite each other when said slotted disc spring is in said fully compressed position.

* * * * *